(12) United States Patent  
Trachsell

(10) Patent No.: US 8,907,515 B2  
(45) Date of Patent: Dec. 9, 2014

(54) WIND ENERGY TRANSFER SYSTEM

(76) Inventor: Glenn Trachsell, Cambridge (CA)

(*) Notice: Subject to any disclaimer, the term of this patent is extended or adjusted under 35 U.S.C. 154(b) by 0 days.

(21) Appl. No.: 13/542,130

(22) Filed: Jul. 5, 2012

(65) Prior Publication Data

US 2013/0009404 A1    Jan. 10, 2013

Related U.S. Application Data

(60) Provisional application No. 61/504,501, filed on Jul. 5, 2011.

(51) Int. Cl.  
*F03D 9/02* (2006.01)  
*F03D 11/04* (2006.01)  
*F03D 3/00* (2006.01)

(52) U.S. Cl.  
CPC *F03D 11/04* (2013.01); *F03D 3/00* (2013.01); *Y02B 10/30* (2013.01); *Y02E 10/74* (2013.01); *Y02E 10/728* (2013.01); *F05B 2240/9112* (2013.01)  
USPC .......................................................... 290/55

(58) Field of Classification Search  
USPC ................................................. 290/44, 55  
See application file for complete search history.

(56) References Cited

U.S. PATENT DOCUMENTS

| | | | |
|---|---|---|---|
| 4,002,218 A * | 1/1977 | Horvat | 180/2.2 |
| 5,296,746 A * | 3/1994 | Burkhardt | 290/55 |
| 5,472,311 A * | 12/1995 | Davis | 415/4.1 |
| 5,644,170 A * | 7/1997 | Bynum et al. | 290/43 |
| 7,358,623 B2 * | 4/2008 | Richards et al. | 290/55 |
| 2009/0102194 A1 * | 4/2009 | M' Ariza Garcia San Miguel et al. | 290/44 |
| 2009/0191057 A1 * | 7/2009 | Knutson | 416/23 |
| 2009/0301796 A1 * | 12/2009 | Wedderburn et al. | 180/2.2 |
| 2010/0194222 A1 * | 8/2010 | Rivoli | 310/71 |
| 2011/0025070 A1 * | 2/2011 | Price | 290/55 |
| 2011/0084494 A1 * | 4/2011 | Andujar | 290/55 |
| 2012/0038170 A1 * | 2/2012 | Stuart et al. | 290/55 |

* cited by examiner

*Primary Examiner* — Tho D Ta

(57) ABSTRACT

An energy transfer system comprising a central shaft, a set of vanes mounted to the central shaft, at least one pump, at least one pulley system, mounted between the central shaft and the pump and an electromagnetic generator located within the central shaft, whereby rotation of the set of vanes by the wind causes the pulley system to generate power and the electromagnetic generator to generate electricity.

3 Claims, 17 Drawing Sheets

WIND ENERGY TRANSFER SYSTEM

CROSS-REFERENCE TO RELATED APPLICATIONS

This application claims the benefit of U.S. Provisional Application No. 61/504,501 filed Jul. 5, 2011, which is incorporated herein by reference.

FIELD

The present disclosure relates generally to energy transfer. More particularly, the present disclosure relates to a system for wind energy transfer.

BACKGROUND

With the rising costs of electricity, many people are searching for new ways to save money while still being able to operate their electrical devices. Different solutions involving the use of solar technology or wind aided technology are being designed and implemented to support this initiative. Another factor for many companies and individuals is the desire for "green" technology solutions which take environmental concerns into account when researching energy or power generation alternatives.

While different systems have been implemented and integrated, there are still many improvements to the technology and designs possible in order to further improve their efficiency, cost, effectiveness, weight and other factors.

It is, therefore, desirable to provide an improved wind energy transfer system.

SUMMARY

It is an object of the present disclosure to obviate or mitigate at least one disadvantage of previous wind energy transfer systems.

In one embodiment, there is provided an energy transfer system comprising a central shaft, a set of vanes mounted to the central shaft, at least one pump, at least one pulley system, mounted between the central shaft and the pump, and an electromagnetic generator located within the central shaft, whereby rotation of the set of vanes by the wind causes the pulley system to generate power and the electromagnetic generator to generate electricity.

In this disclosure, the use of a horizontal wind turbine rather than "rotor turbines" allows electricity to be produced without a need for towers in cities and urban areas on existing rooftops. The disclosure takes advantage of flat rooftops that reach higher than many rotor towers are able. Easy access to these rooftops by elevator or stairs allows a consultant to evaluate pay back with such things as anemometer.

In operation, vanes on rotors receive most of their energy close to the end of their swept area and reduces to zero at the hub. The horizontal vane in the current disclosure accepts the wind's energy along the full length of the vane and then transfers it into power even in high winds which may be an improvement over current systems where rotor blades are shut down in higher velocity winds.

The current disclosure provides for a wind energy transfer system which may be manufactured to an individual's needs from developed specifications. The system may also include holding tanks for storing generated energy which may provide power during low wind conditions.

In one implementation, the system may be manufactured adjacent to areas with multiple square meters of flat rooftop buildings and then customized by wind consultants and engineer specifications.

By providing a system to producing energy or electricity where the load is used reduces costs without a larger footprint on the environment and provides an advantage in delivery costs as well. Unlike conventional wind turbines this invention does not have to face directly into the wind to operate but accepts the wind from different angles.

Also, the system of the disclosure may also operate at night to produced or store electricity and provides advantages over current systems being able to provide electricity during peak times. Also, the system directs any surplus energy produced in high winds to a holding tank or batteries for storage. For start up in low winds electronic pressure valves can also release the pressure on the nozzles to the hydroelectric turbine.

Other aspects and features of the present disclosure will become apparent to those ordinarily skilled in the art upon review of the following description of specific embodiments in conjunction with the accompanying figures.

BRIEF DESCRIPTION OF THE DRAWINGS

Embodiments of the present disclosure will now be described, by way of example only, with reference to the attached Figures.

DETAILED DESCRIPTION

Generally, the present disclosure provides a system for wind energy transfer. The system is preferably mounted in a location where it comes into contact with wind such as on the roof of a building or a tower, among other possible locations. The system may also be mounted to a vehicle.

The system includes an apparatus for translating wind power, such as a wind generator, which translates the wind power into power or energy via an energy generating apparatus.

Figure 1A:
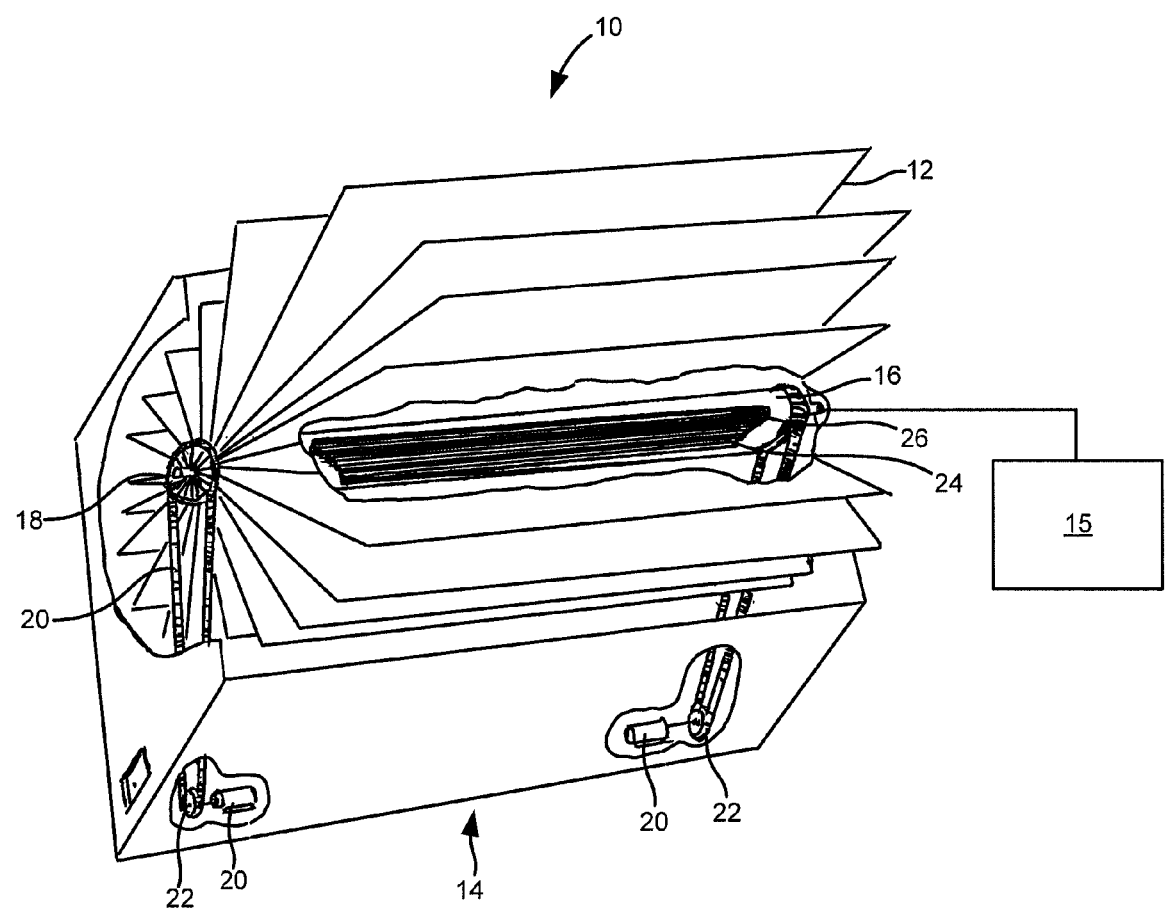
FIG. 1A is a perspective view of a system for wind energy transfer.

FIG. 1A is a perspective semi-broken view of a wind generator for use in a wind energy transfer system. The drawings within this application are not meant to be to scale but are schematic representations. In the current embodiment, the wind generator 10 is seen as a horizontal wind generator and includes a housing 14 which houses a set of vanes 12. The vanes 12 may be manufactured from different materials which include, but are not limited to, aluminum, carbon fibre, wood, bamboo, fiberglass, or any other composite material. Depending on the desire of the manufacturer or purchaser, the vanes may be produced in any colour. In one embodiment, in order to preserve the aesthetic nature of the building or structure on which it may be mounted, the vanes may be the same colour as the shingles on the roof or even the same material.

In one embodiment, the system includes an electromagnetic generator as will be discussed below. The electromagnetic generator may use rare earth metals in its rotor or the electromagnetic generator may use coils to generate its electricity.

As the vanes within the coiled electromagnetic generator turn counterclockwise, the armature is turning clockwise by gears inside the shaft. The shaft of this electromagnetic generator is typically smaller than other systems and therefore the vanes have more depth and therefore a larger surface for receiving the wind. This is not unlike a sailboat's sails, which accepts wind from different angles to gives it more a consistent torque.

In the embodiment with the electromagnetic generator using rare earth metals, a larger number of vanes may be used and their depth decreased to allow for an efficient large diameter shaft containing for the "rare earth magnetic rotor" with centrifugal force speeds.

The horizontal wind generator with its basic rectangular structure placed on rooftops, open fields, open water or towers may be made to certain specifications containing the equipment that transfers wind energy to power is the "work horse" of this invention with its large swept area having the capacity to transfer large amounts of wind energy.

Figure 14:
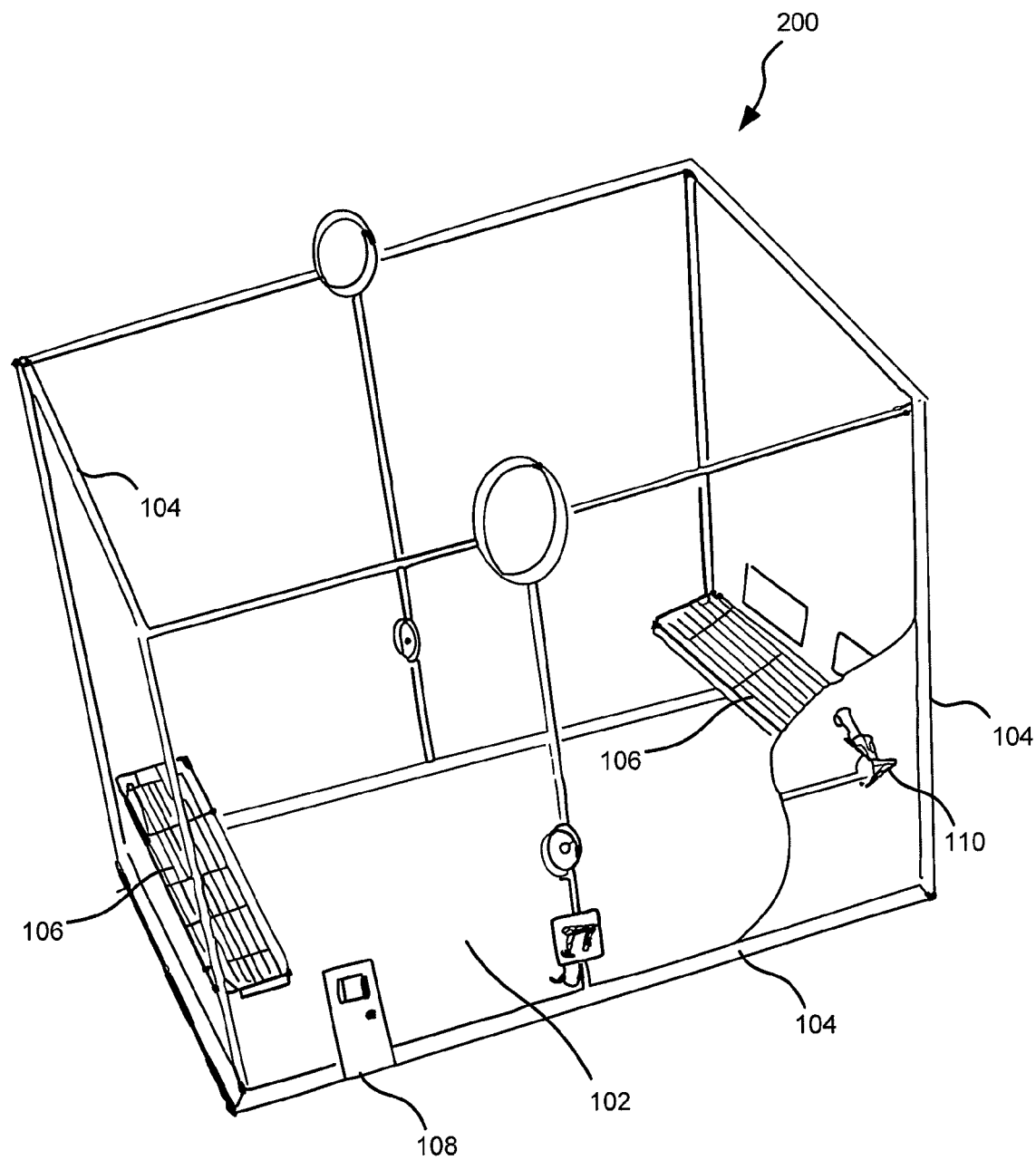
FIG. 14 is a perspective view of another system for energy transfer.

An example of this structure is shown in FIG. 14. This basic rectangular structure 200 accommodates the weight and breadth of this wind generator. Its flooring 102 is constructed of honeycomb or grid-shaped so that rain can pass through and heated if in a snow area. This grid or honeycomb floor is welded or bolted to a skeleton of square tubular frame 104 to which is attached an outer skin of one of the above materials (not shown or shown as transparent to reveal the contents of the structure 100. Also attached to this frame are two shelves 106 located just below the vanes lower swept area leaving enough room for the vanes to turn. The frames are preferably constructed of stamped heavy gauge steel and welded or bolted to the structure giving it strength to hold the equipment.

Above the front bench access is left in the frame for a door 108 or to able to bump out if necessary for such as a powered drive shaft.

On the front bench in this structure, equipment 110 such as hydraulic pumps, generators, and alternators are powered through roller chain gears or belts that are attached to the vanes converting wind energy into power. The back bench accommodates such things as batteries, hydraulic cylinders for turnstile and electronics all run by the electromagnetic generator.

One advantage of the current system is that torque is produced along the full length of the vanes. At each end of the vanes are stamped asterisk shaped steel brackets giving them stability. To these steel brackets are attached sprockets sized to specification but no larger than the vanes swept area. The sprockets have an indented base so the roller chains will not chaff the vanes.

Directly below this sprocket attached to the vanes is a smaller one, which increases rpm. By being directly below the large sprocket lowers the stress on this heavy roller chain and also helps to increase centrifugal force. This smaller lower sprocket is secured to the base structure with its shaft extending outside it to a gearbox that controls rpm or torque. This gearbox enclosed in a nacelle has a pulley with a V belt that drives a pulley in the same area as the bench and which its shaft goes to the inside to drive a piece of equipment secured to the shelf. If the gearbox is not required then the roller chain and sprockets can power directly from the inside.

This design allows flexibility for example sprockets could be installed in the middle of the vanes to power something without a gearbox. A shaft driving just one piece of equipment instead could be a shaft with multiple pulleys or gears. To make room for this shaft an area in the basic structure can be bumped out. This arrangement of gears and or pulleys can be easily changed to accommodate such things as alternators that work efficiently at high speed and lower speed for torque to power such things as hydraulics, grinding mills and compressors.

With doors to the bench, a technician has easy access to install or service such equipment, which can be hydraulic pumps, alternator, air compressor, water pump or any like equipment.

The vanes on this disclosure are designed to take advantage of "high torque" or "high rpm" depending on what its operation requires. The larger the surface on the vane exposed to the wind and with the least number of vanes required provides the most torque. With closer vanes volume of air between is less and disperses quicker giving more rpm.

Turning back to FIGS. 1A and 1B, the set of vanes 12 is attached to a central shaft 16, preferably steel, which is connected at each end to individual gears, or pulleys 18. The shaft comprises a core portion 24 and an outer portion 26. In one embodiment, the core portion 24 includes an electromagnetic generator (such as the ones disclosed above) with an electronic voltage regulator. Within each gear 18, there is a vent, preferably fan-shaped, which provides cooling to the electromagnetic generator.

The outer portion 26 includes an outer casing which includes magnetic coils for interacting with the electromagnetic generator to produce an electromagnetic field or electricity. This electricity may be stored in a power storage medium 15, such as a battery. As will be described below, in the preferred embodiment, the generated electromagnetic field does not cause any drag on the energy transferred from wind power to kinetic power.

Within the housing 14 is apparatus for transferring wind energy into power or energy 20. Example of this apparatus 20 include, but are not limited to, hydraulic pumps, air compressors, generators or water pumps. While not shown in FIGS. 1A to 1C, the apparatus 20 is preferably connected to a turbine, such or a Pelton turbine.

Figure 13:
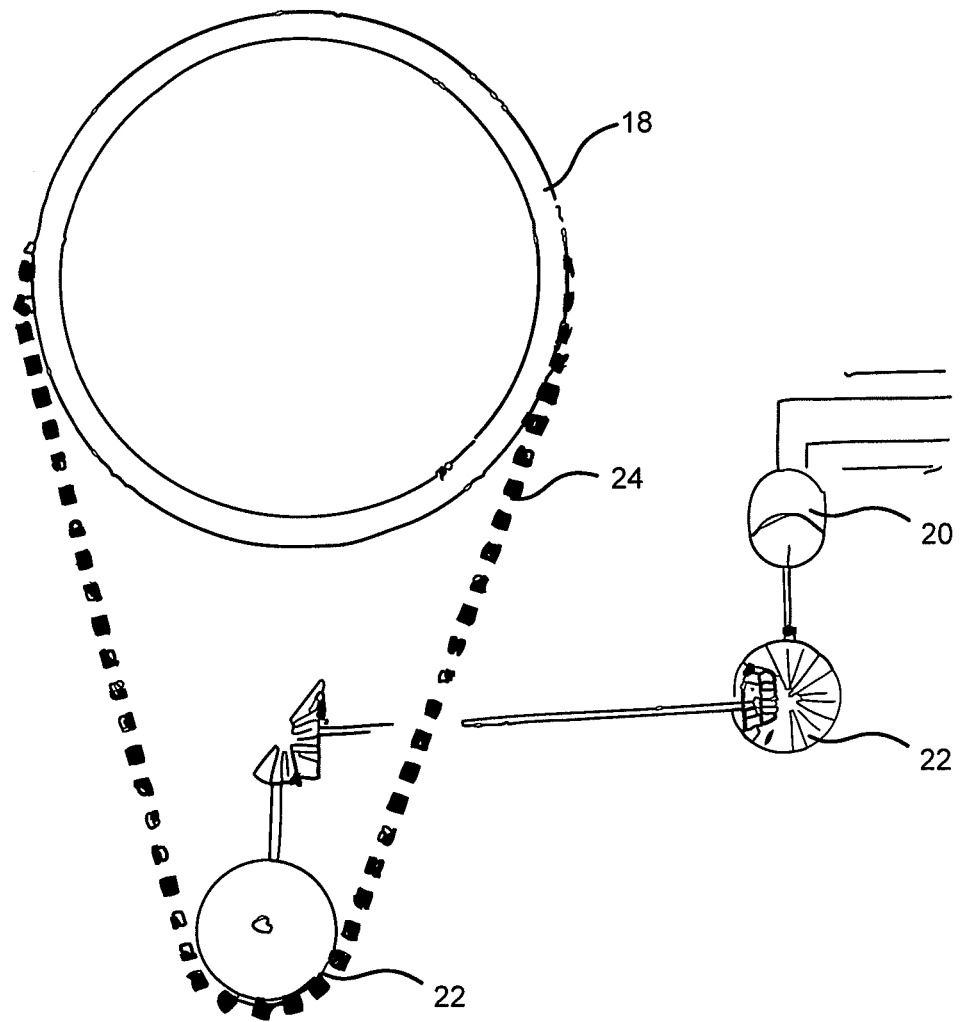
FIG. 13 is a side view of a portion of the system for energy transfer.

The apparatus 20 preferably includes a drive portion 22 which includes a belt system 24 which connects one of the gears 18 with its associated drive portion 22. In an alternative embodiment, the connection or relationship between the gear 18 and the drive belt system 24 may be replaced by gears, automatic or hydraulic transmission or a manual clutch. A schematic diagram of a side view of the connection between the drive portion and the gears is shown in FIG. 13.

Although not shown in the current embodiment, the system includes a mounting apparatus located on a surface of the housing 14 which allows the wind generator 10 to be mounted to a structure such as a building or tower which may be made from plywood, aluminum, fiberglass, steel; or bamboo laminate. The material or materials used to manufacture the mounting structure may be dependent on the application of the system or the location where the system is being mounted, or both.

In operation, the set of vanes 12 rotate due to the presence of wind. The rotation of the vanes 12 cause the shaft 16 to rotate, thereby rotating the gears 18 at each end of the shaft 16. The rotation of the gears 18 cause the belt system 24 to drive the individual drive portions 22 and therefore, the apparatus 20, thereby producing energy which may be stored by the turbine for later use such as during an emergency situation or may be immediately used by the turbine for selected functions. Alternatively, the energy produced may be used to continually power a device which is directed connected to the apparatus 20. In systems where there is an electromagnetic generator within the shaft, the rotation of the vanes also produces a second energy source.

In one embodiment, a turnstile may be used to allow the vanes to turn in only one direction. If there is no turnstile present, such that the vanes may rotate in either direction, reversible pumps and/or manual or hydraulic transmissions may be used.

Figure 1B:
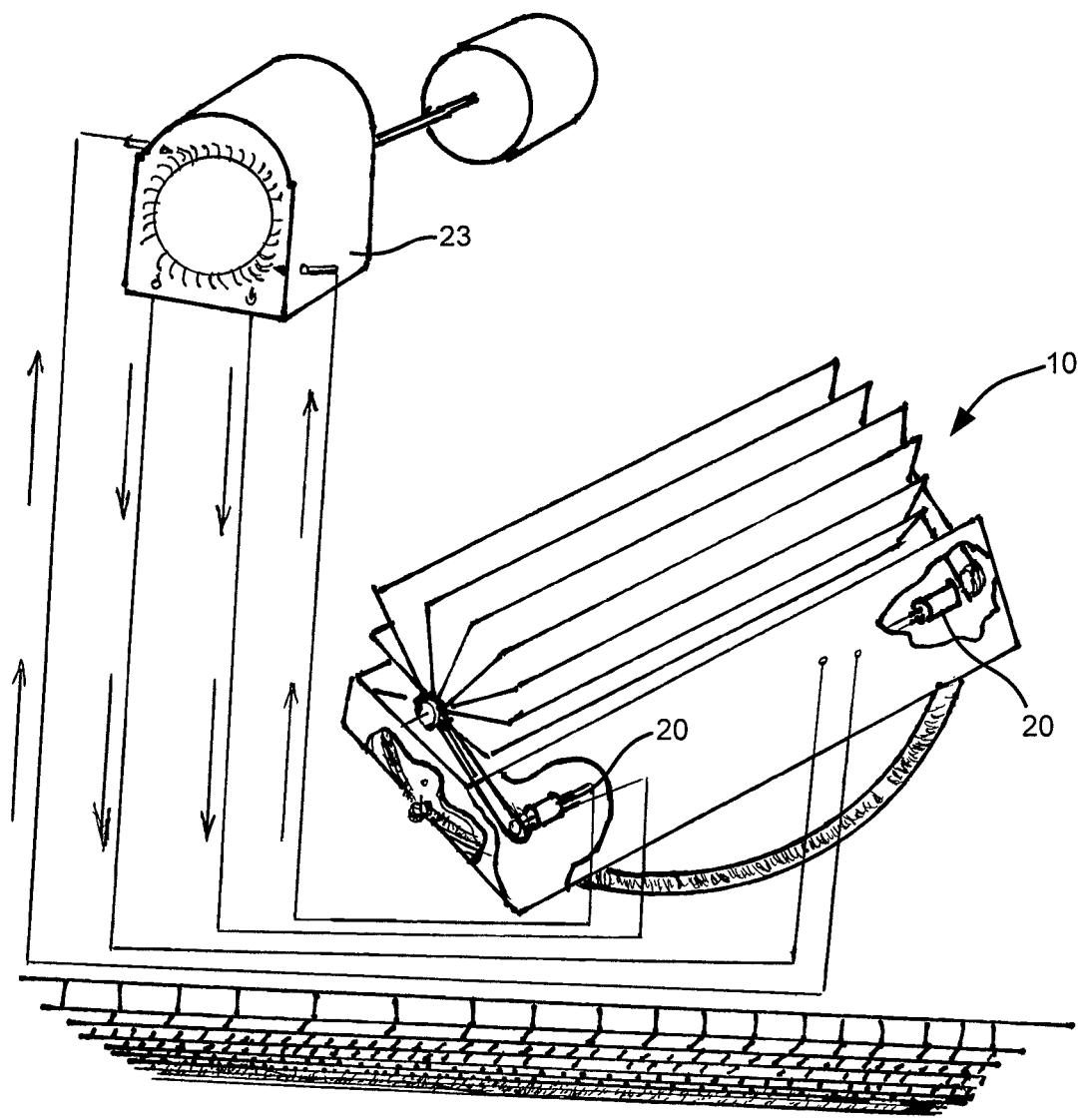
FIG. 1B is a perspective view of a system for wind energy mounted to a rooftop.

FIG. 1B is a schematic diagram of the generator of FIG. 1A connected to a turbine. As shown in FIG. 1B, the generator 16 is connected to the turbine 23 via the apparatus 20.

Figure 1C:
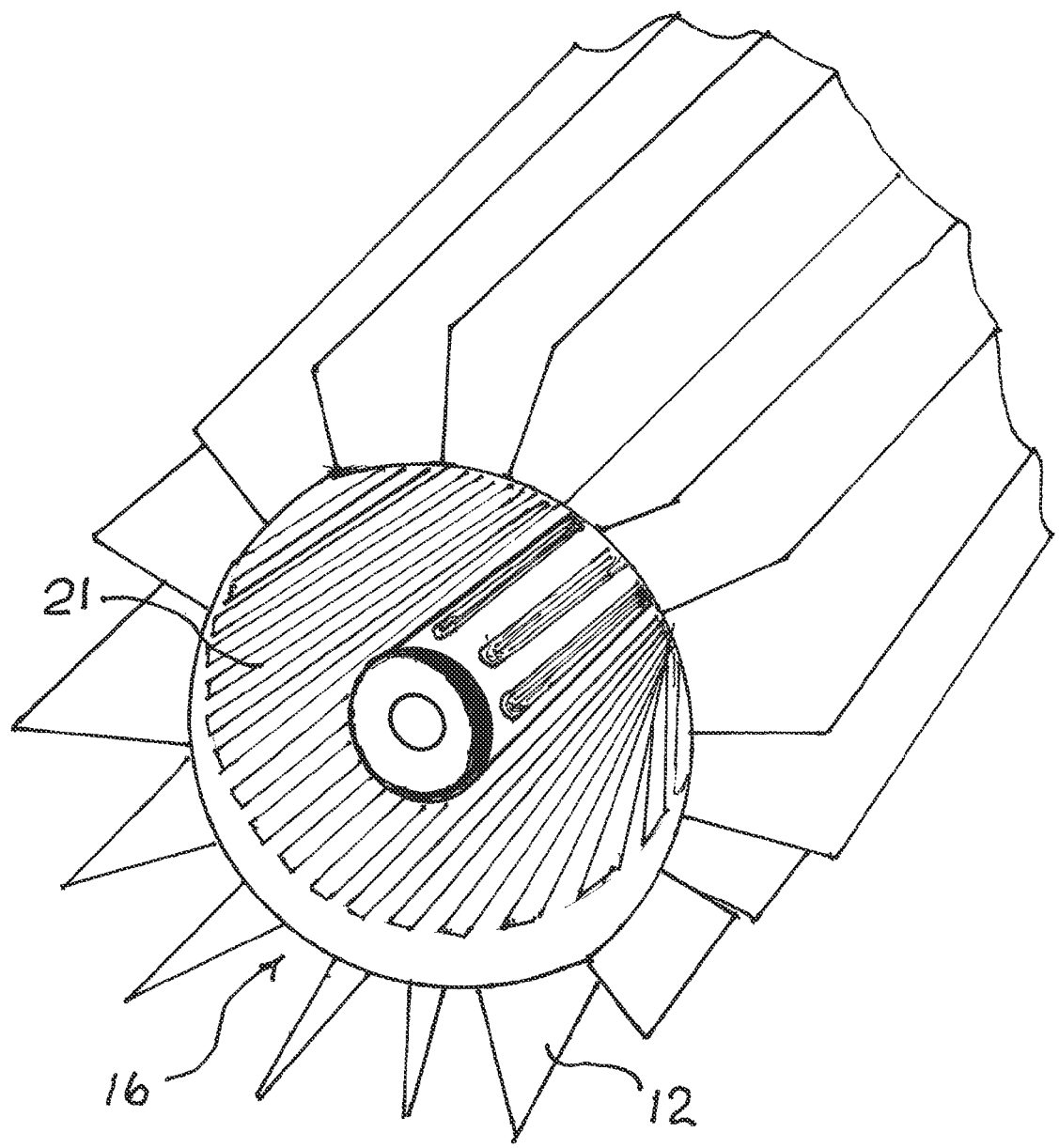
FIG. 1C is an enlarged view of an embodiment of a set of vanes and central shaft in a system for wind energy transfer.

FIG. 1C is an enlarged view of another embodiment of the set of vanes and the central shaft. In the current embodiment, the set of vanes 12 are connected to the shaft 16. Within the shaft is a stator 21 (or the electromagnetic generator) which acts as a field magnet when the shaft 16 rotates due to the power of the wind against the set of vanes 12. The electromagnetic field which is created may then be used to generate energy for powering other devices or apparatus or may be stored for later use by such devices and apparatus.

Figure 2A:
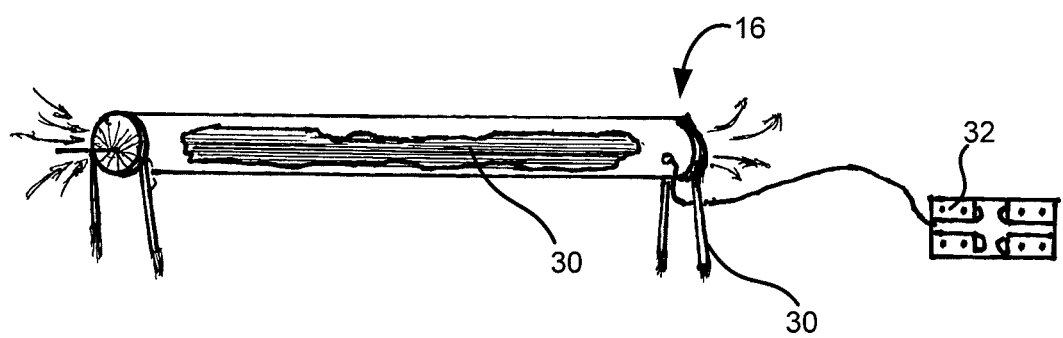
FIG. 2A is a schematic view of a magnetic generator of a system for wind energy transfer.

Turning to FIG. 2A, a schematic diagram of another embodiment of the electromagnetic generator is shown. The electromagnetic generator 30 generates electricity as the set of vanes 12 rotate the central shaft 16. The magnetic core of the generator 30 produces a magnetic field with the outer portion 26 to produce electricity. The electricity that is generated may be used for different applications such as to recharge batteries 32. As discussed above, the electromagnetic generator 30 is located within the shaft 16. In one embodiment, electricity or power may be produced both by the electromagnetic generator 30 and by the apparatus for transferring wind energy into power or energy 20 to provide multiple ways to generate power from one wind source. In another embodiment, propeller-driven style electric generators may extend from the shaft which may rotate to provide further benefit from the capture of wind power.

Figure 3:
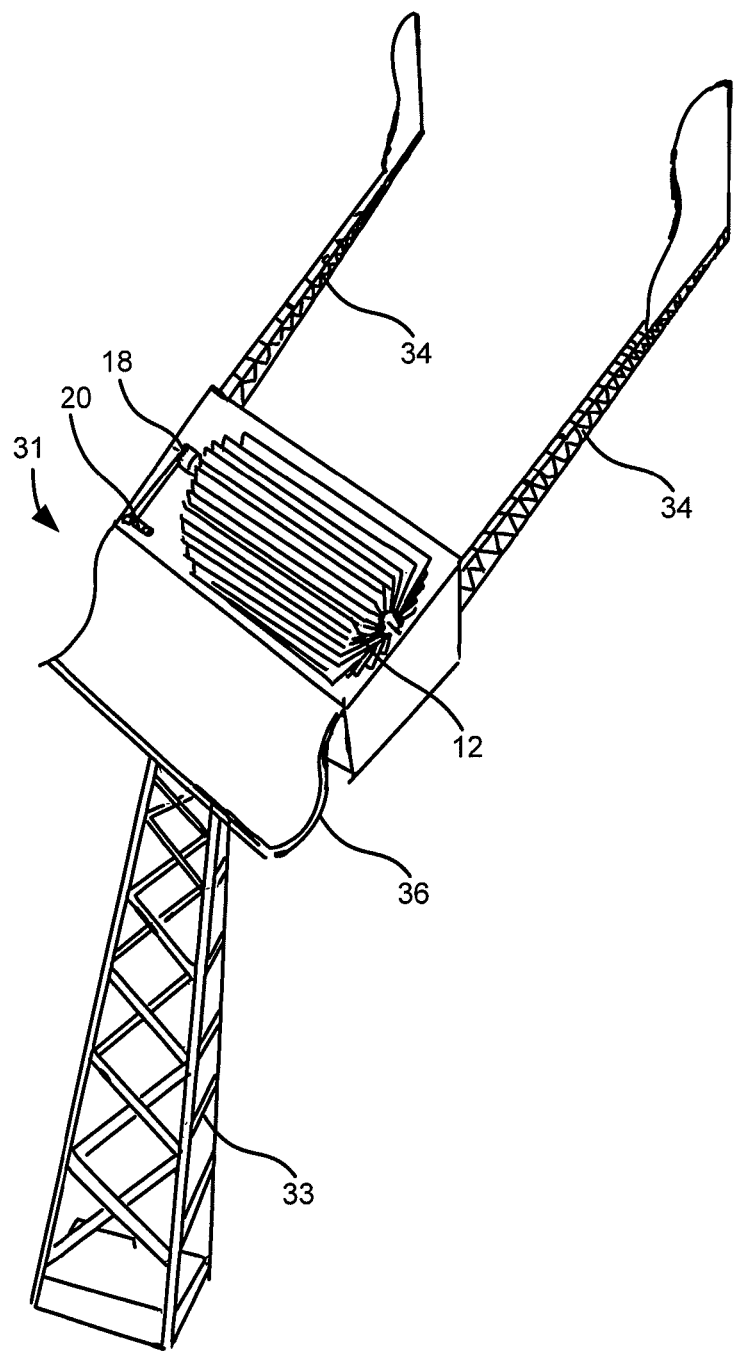
FIG. 3 is a perspective view of another embodiment of a system for energy transfer.

Turning to FIG. 3, a schematic diagram of a wind energy transfer system mounted to a tower is shown. This embodiment may be see as a tail wind generator. In this embodiment, the wind generator 31 is mounted to a tower 33, such as a power line tower, and includes each of the portions disclosed above such as the set of vanes 12, housing 14, central shaft 16 etc. and further comprises a pair of twin tails 34. A wind spiller 36, or an apparatus for directing wind towards the set of vanes 12, is attached to the housing 14 and deflects or directs the wind toward the set of vanes 12 to increase the contact between the wind and vanes 12. In one embodiment, the generator 31 may be manufactured using materials which are light and strong to reduce the stress on the tower 33. A market for this product may be property-owners that normally purchase propeller generators to provide their own electricity.

As such, in an alternative embodiment of manufacture, the generator 31 may include propeller generators, which may be gear or belt driven to produce electricity from the wind along with the electromagnetic generator 30 within the shaft 16. The tail wind generator 31 may further include a yawl mechanism to improve the sturdiness or stability of the generator in high wind situations. The generation of energy by the system may be performed as discussed with respect to FIGS. 1A to 1C depending on the set up of the wind generator 31.

Figure 4:
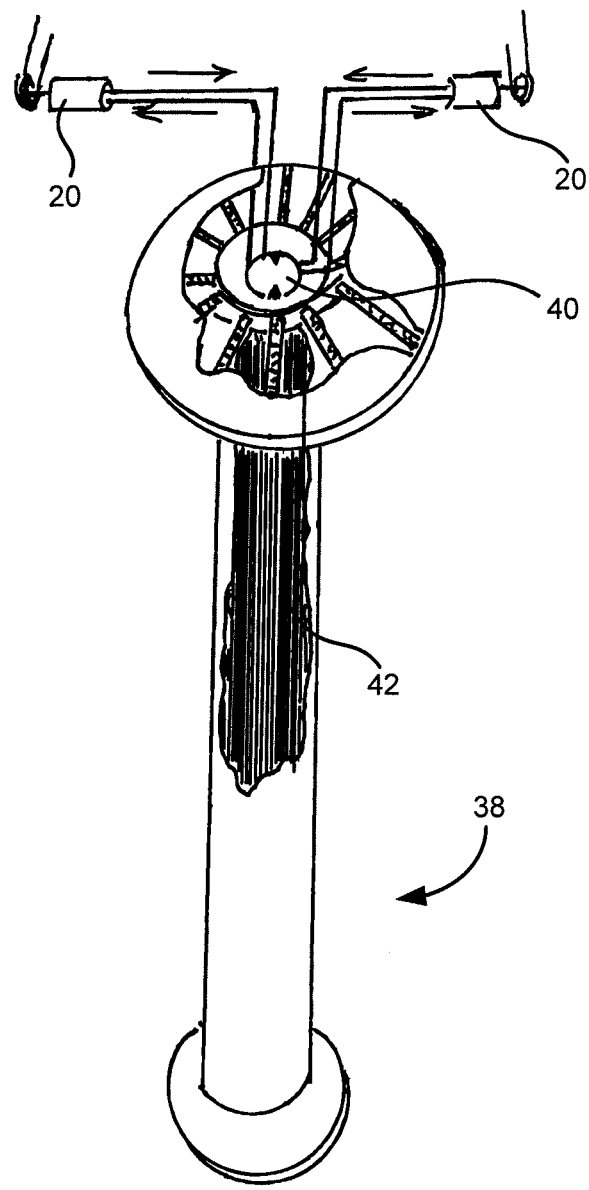
FIG. 4 is a perspective view of yet another embodiment of a system for wind energy transfer.

Turning to FIG. 4, yet a further embodiment of a wind energy transfer system is shown. In the current embodiment, the system may be seen as a Generator Tower which may be used in conjunction with the tail wind generator of FIG. 3 or the generator of FIG. 1A which would be mounted atop the tower 38. Assuming that the apparatus for transferring wind energy into power or energy 20 has been connected to the shaft (or gears associated with the shaft of the system (not shown)), the energy generated by the apparatus for transferring wind energy into power or energy 20 may power a set of twin motors 40 which further drives an electromagnetic generator 42 encased in the tower 38. The electricity generated by the electromagnetic generator 42 may charge batteries which may be used to power lights on the tower 38 or assist in controlling yawl in turbulent winds or any other devices which require electricity. The tower 38 may be made of similar strong materials as for wind turbines and therefore the wind generator 31 can be made to different standards. The generator 31 may be air cooled by chimney effect ventilators holes in the bottom and the top of the tower 38.

Figure 5:
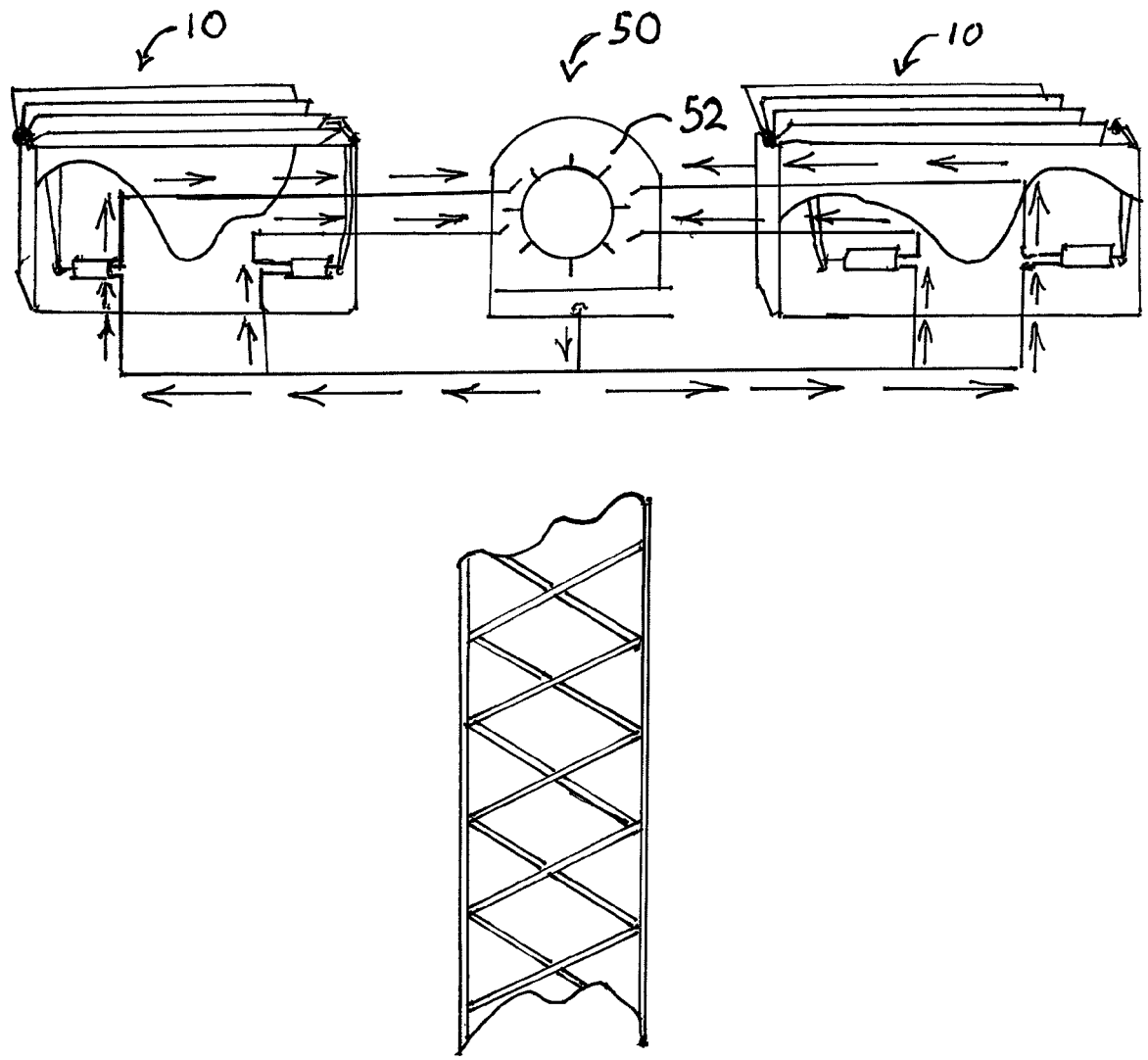
FIG. 5 is a perspective view of a further embodiment of a system for wind energy transfer.

Turning to FIG. 5, yet another embodiment of a wind energy transfer system is shown. This embodiment may be seen as a turbine tower embodiment. In this embodiment, the system 50 includes a hydroelectric turbine 52 (resting on a platform (not seen)) that would be connected to a grid for providing and distributing power. On each side of the platform (which may be located at the top of a tower) is a horizontal wind generator 10 (such as disclosed above in FIG. 1A) including a set of apparatus for transferring wind energy into power or energy whereby the apparatus 20, such as hydraulic pumps, have spigots connected to nozzles in the turbine. In one embodiment, the electromagnetic generator 30 within each of the wind generators 10 may charge batteries for powering devices which also track characteristics of the wind, such as, but not limited to, direction and speed or for powering devices to enable communications, via a processor, between the wind energy transfer system and a host server or command centre.

Figure 6:
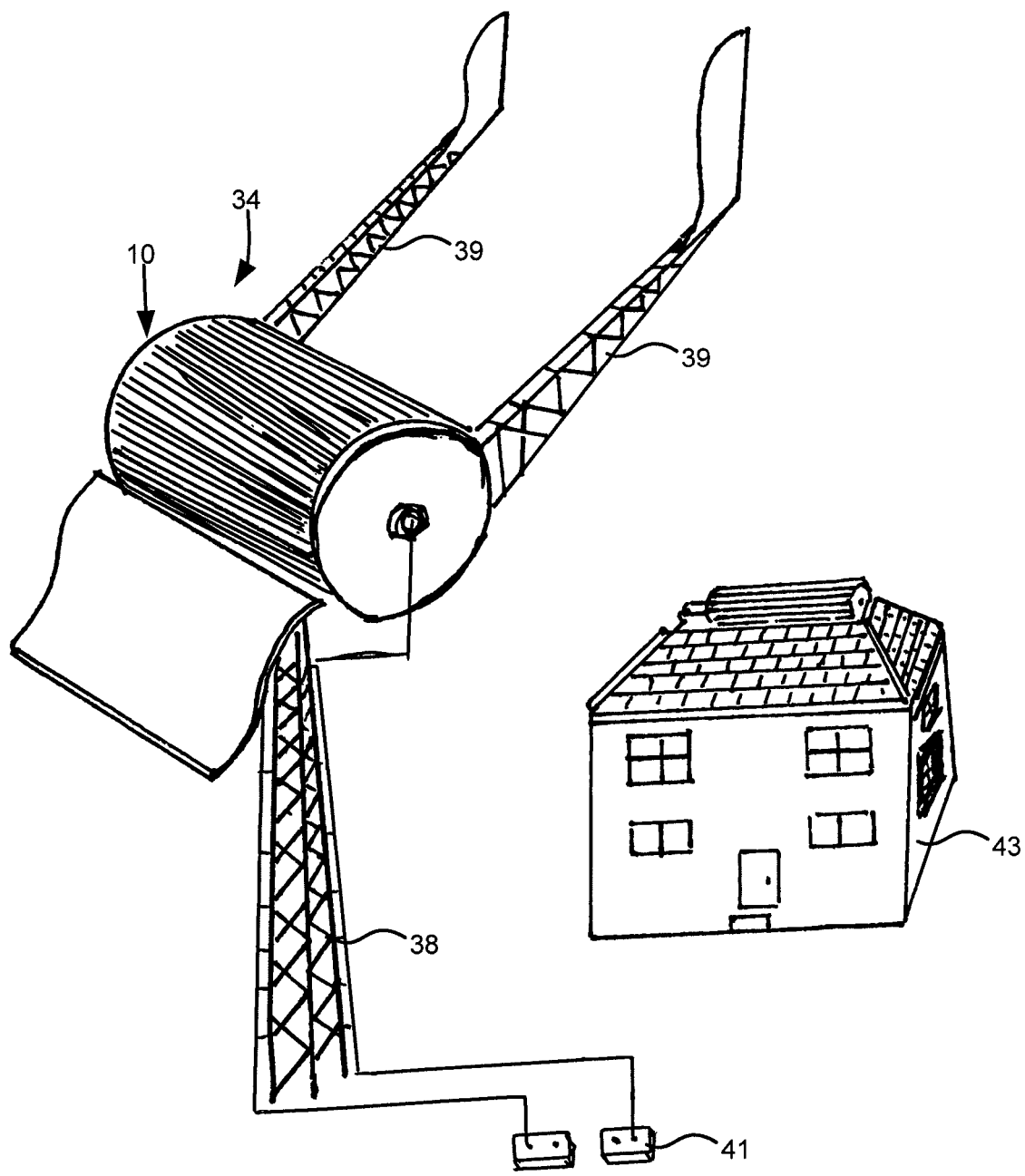
FIG. 6 is a schematic view of another embodiment of a system for energy transfer.

Turning to FIG. 6, yet a further embodiment of a wind energy transfer system is shown. In the current embodiment, the wind generator 10 is mounted to a tower 38. The wind generator system 34 includes a pair of tails 39 which assist in providing stability to the wind generator 10 when mounted in the face of high winds and the like. The output from the wind generator 10, including the electricity generated by the electromagnetic generator may be used to charge batteries 41 which in turn may be used to power devices within a home 43. The design of the wind generator may also be done to improve or enhance the look of its surrounding, such as behind a facade of the house or home 43.

Figure 7:
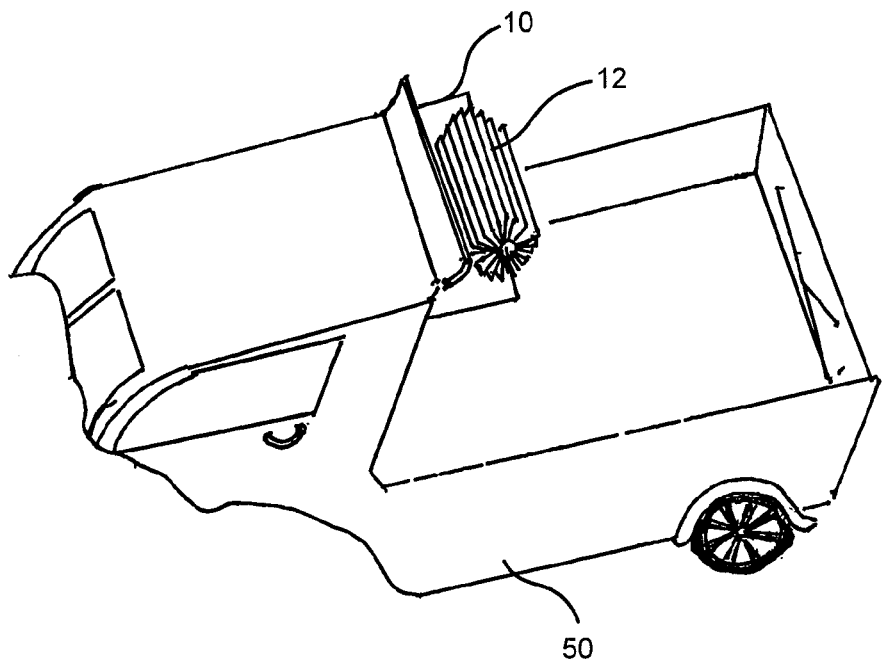
FIG. 7 is a schematic view of another embodiment of a system for energy transfer.

Turning to FIG. 7, another embodiment of a wind energy transfer system is shown. In this embodiment, which may be seen as a mobile wind embodiment, the wind energy transfer system includes a wind generator 10, preferably a horizontal wind generator, mounted to a vehicle 50. In this embodiment, only electricity is generated by the electromagnetic generator to charge the battery and there is no gear or pulley system to generate power for a turbine. As with the other embodiments disclosed above, the wind generator 10 may include an electromagnetic generator within the central shaft. As can be seen, in this embodiment, the wind generator 10 may not include a housing as the set of vanes 12 may be mounted directly to the vehicle. Although not necessary, the wind energy transfer system may include a wind spiller to direct wind towards the set of vanes when the vehicle is in motion in order to increase the amount of wind directed towards the set of wanes thereby allow more power or energy to be generated by the system. In some implementations, the vehicles, such as minivans or buses, may include an indent on their roof to accommodate the generator 10. The energy generated by the wind generator may be used to assist in powering the battery of the vehicle especially if the vehicle is an electric vehicle.

Figure 8:
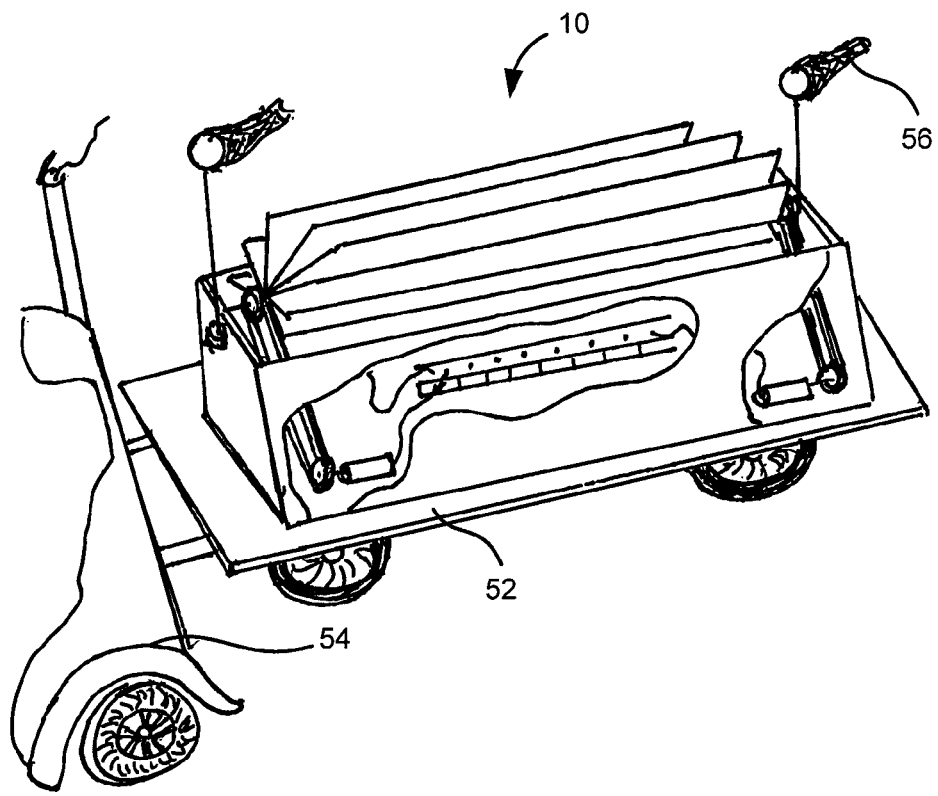
FIG. 8 is a schematic view of another embodiment of a system for energy transfer.

Turning to FIG. 8, yet a further embodiment of a wind energy transfer system is shown. The system of FIG. 8 includes a wind generator 10 which is mounted to a rotatable trailer 52, flat-bed or platform which may be towed by another vehicle 54. A one-post hoist on the trailer 52 may be used to raise and lower the wind generator 10. The wind energy transfer system may be a part of the wind energy system which provides energy where it is needed.

If electronic tracking is enabled, windsocks 56 may be attached to sensors which sense the wind direction and as they turn, the sensor may transmit signals to have the wind generator 10 rotate in accordance with the wind direction to increase the speed of the set of vanes.

Figure 9:
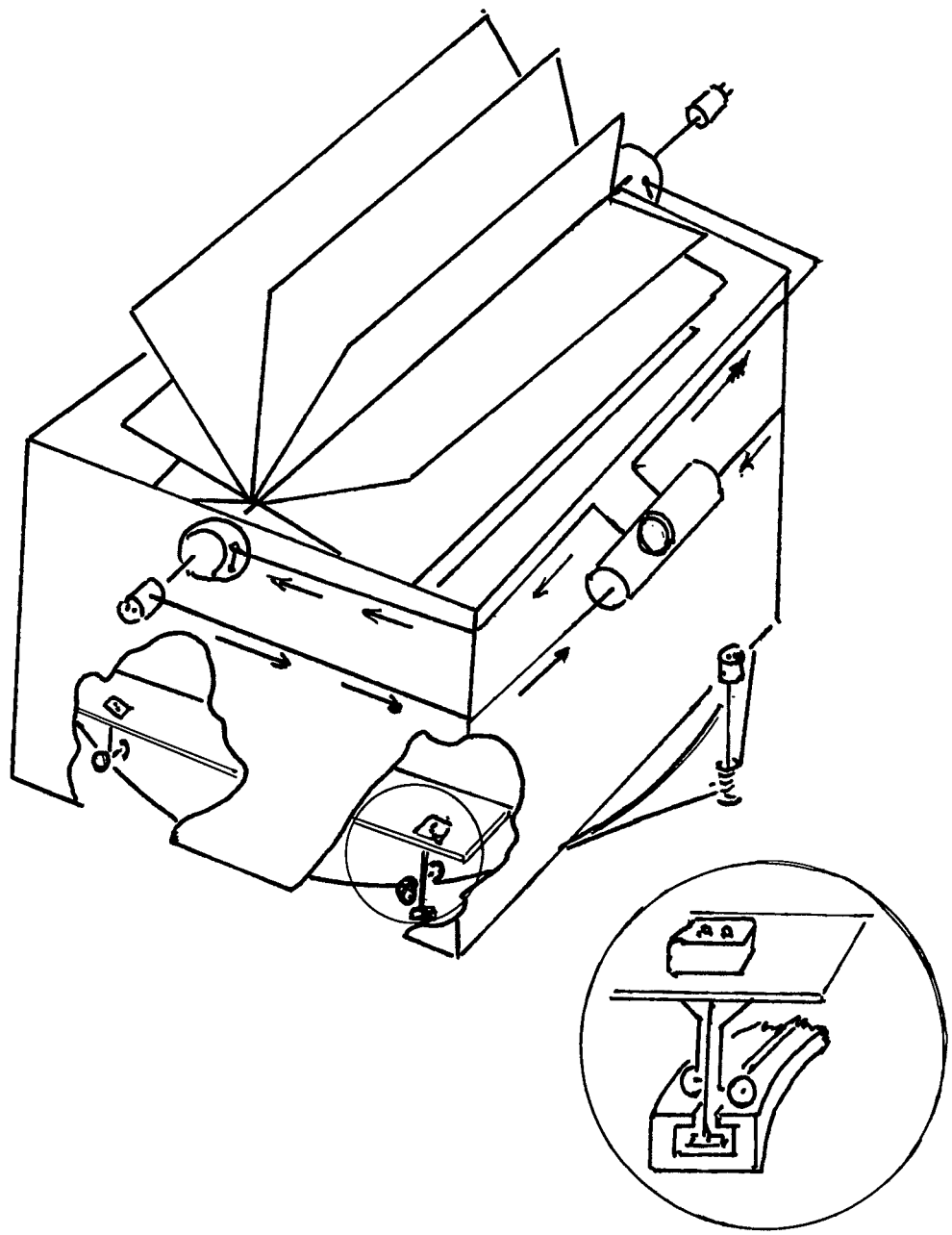
FIG. 9 is a schematic view of another embodiment of a system for energy transfer.

Turning to FIG. 9, yet a further embodiment of a wind energy transfer system is shown. In the system of FIG. 9, the system includes a turnstile made of prefabricated concrete that has a groove which accepts a clamp that stabilizes the structure. An example is shown in the enlarged portion at the bottom of the figure. In the preferred embodiment, this stabilization is performed by hydraulics. On each side are wheels that allow the motor to change directions, which does not require a full turn. The prefabricated concrete also does not require a full circle. If reversible pumps are not available or a standard off the shelf is better then so there is no drag on one pump when the wind comes from another direction the system deactivates that pump.

Figure 10:
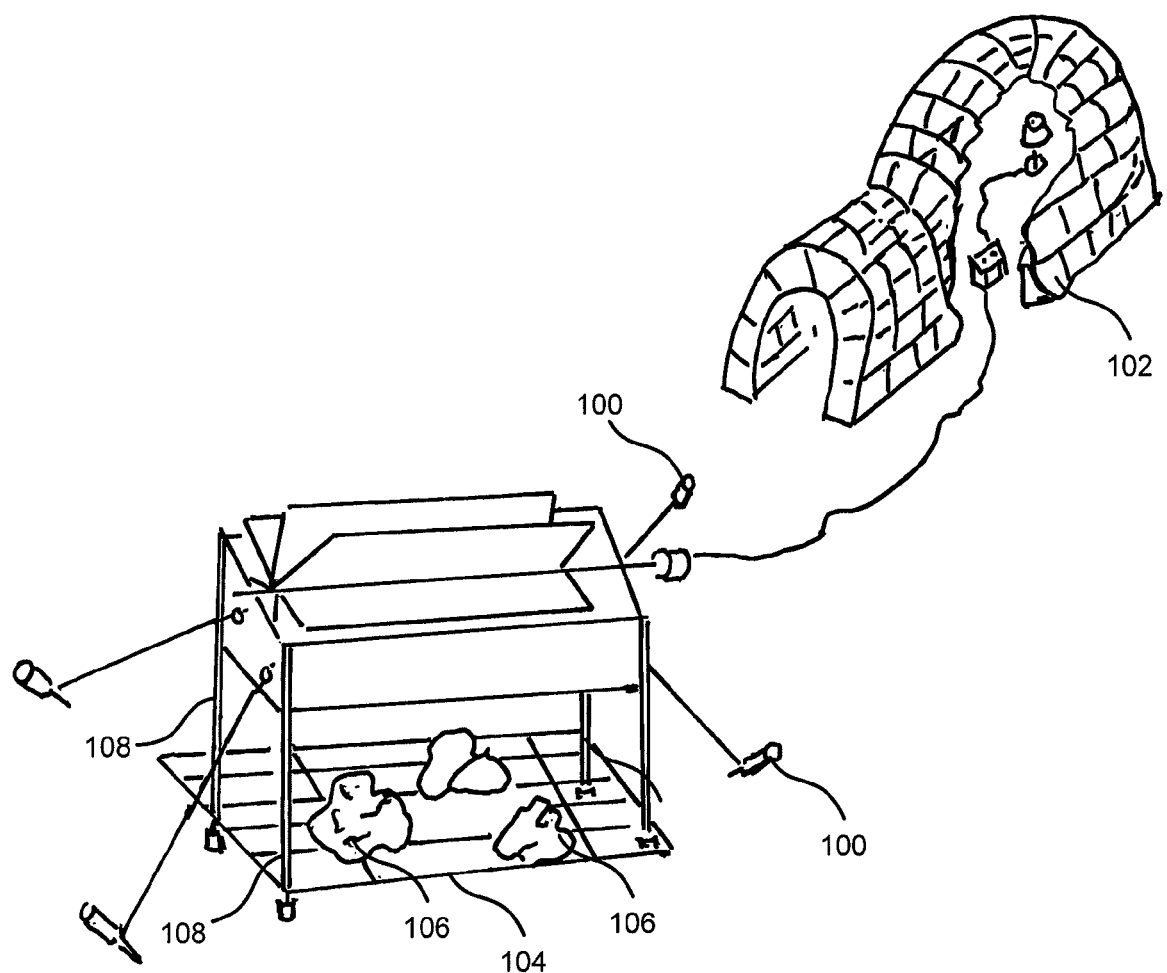
FIG. 10 is a schematic view of another embodiment of a system for energy transfer.

Turning to FIG. 10, another embodiment of a wind energy transfer system is shown. In this embodiment, the wind energy transfer system may be an independent and portable system. The system includes a wind generator 10 which is located within a housing 14 and then spiked 100 into the ground in order to stabilize the system so that the system does not fall over. As with the previous embodiment, the wind generator may be connected to apparatus for generating energy from wind 20 which may then be stored or used for powering other devices. With a portable embodiment, the system may be set up so that it operates in a location close to a residence 102, such as an igloo, whereby the power or electricity generated by the wind generator may be connected to appliances or devices within the residence which require electricity. In this embodiment, electricity may be provided to the igloo in even the darkest months which provides an advantage over solar powered energy solutions.

For the portable embodiment, the generator may be manufactured from a lightweight material with the vanes stabilized within grooved sleeves. A power grid 104 for storing the generated power may be covered with stones 106, logs, or snow and located beneath the generator 12 as a support whereby the legs 108 of the generator fit into slots.

Figure 11:
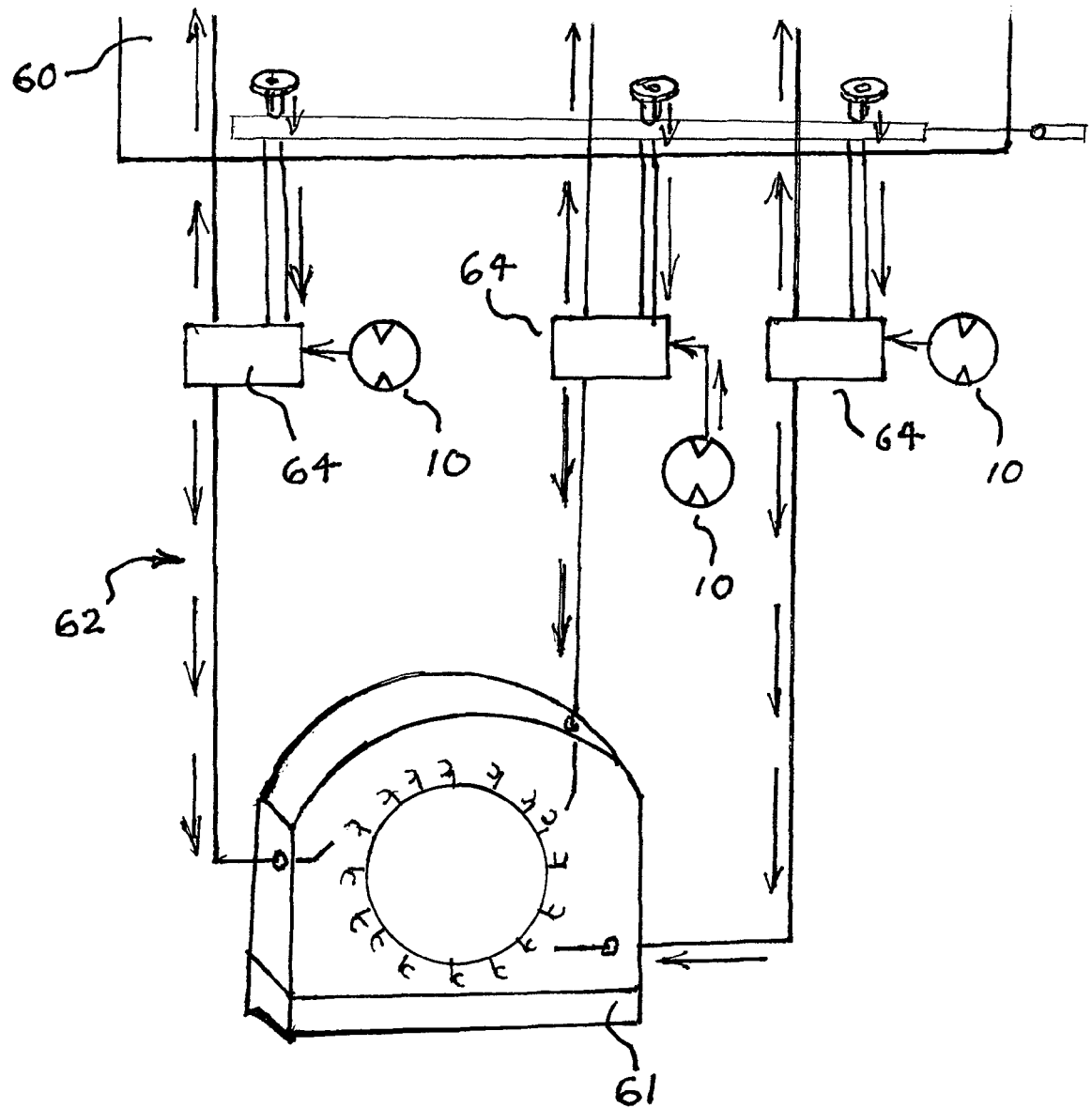
FIG. 11 is a schematic view of another embodiment of a system for energy transfer.

Turning to FIG. 11, a schematic view of a turbine for use in a wind energy transfer system is shown. Although not shown in its entirety, an udder tank 60 is located above the Pelton turbine 61. Between the udder tank 60 and the Pelton turbine 61 is a set of piping 62 which includes a set of sensors 64. Individual wind generators 10, such as those described above, are also connected to the sensors 64. In operation, if the sensors determine that the power generated by the wind generators is insufficient to power the Pelton turbine, the sensors allow power from the udder tank to be mixed with the wind generator power to match the requirements of the turbine. The sensors, or control pressure valves may be wired for Wi-Fi and a computer program controls pressure from the udder tank to equalize pressure to the hydroelectric turbine. At any time when the wind generator provides power which is more than the turbine requires, this excess power may be stored in the udder tank.

Figure 12:
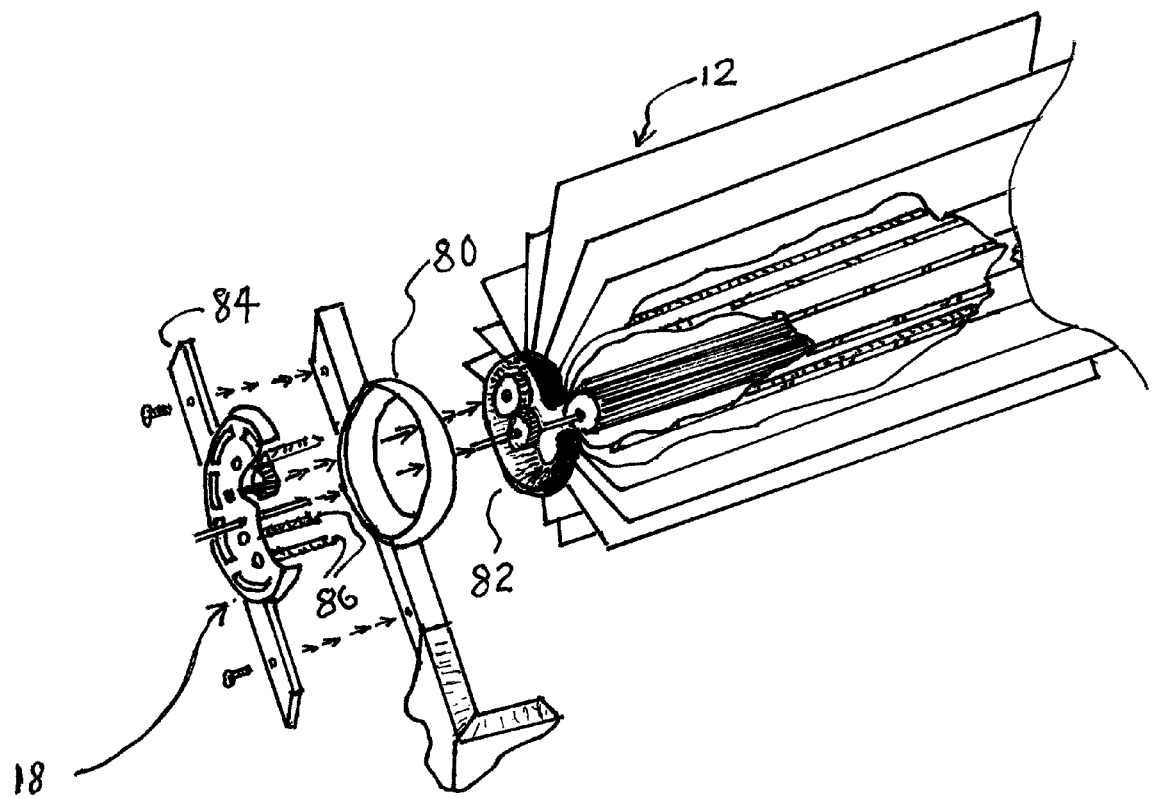
FIG. 12 is a schematic diagram of a shaft for use in a system for energy transfer.

Turning to FIG. 12, a more detailed view of a shaft and generator is shown. In this figure, the central shaft 16 includes the set of vanes 16 which are attached to the central shaft. A set of bushings 80 is located at each end of the shaft 16 along with a gear box 82. A bracket 84 for mounting a gear 18 is attached to the gear 18 which also includes a set of rods 86 for holding magnets in place. A busing for an armature rod 88 along with gear attachments 90 are also located on the surface of the gear 18.

In one embodiment, although the shaft may be divided in two the armatures generating electricity share the same axle, which runs the complete length of the rectangular basic structure. The axle that powers the armatures also drives a hydraulic pump by a pulley, which is at the halfway mark of the axle.

Furthermore, fitted into the gears is a reducing gear, which also turns counterclockwise. This reducing gear then powers the armature's smaller gear, which spins the armature clockwise past the magnetic field at an increased rate of speed compared to the outer housing of the shaft.

A machined end cap with a lip fits within the end of the shaft and is stationary. It has brackets that secure it to the shaft and contains a bushing for the spinning armature axle, along with a stationary axle with a bearing for the reducing gear.

In one embodiment, in the middle of the shaft are two half walls with a space between them. This allows the end cap brackets on each of the middle half of the shaft the solid attachment they need. On this middle end cap attached are the other end of the four rods that hold the stationary magnets and the bearing for the axle that passes through it and then has an attached pulley before continuing on to the next center end cap and the other half of the electromagnetic generator in which the above instructions are repeated.

The difference between the end caps in the center and the ones on the outside end of the structure is there is no gearbox in the center end caps. All power is provided from each gearbox and end cap at the extreme end of the basic rectangular structure.

Between the two half walls that are solidly attached to the back wall of the structure is a pulley on the same axle that drives the armatures. A belt on this pulley drives the hydraulic pump, which powers the Pelton Hydro Electric Generator that is in close proximity so there is very little loss of energy to the fluid due to friction.

Depending on the hydraulic pumps size there should be room within the structure for it. This is because the vanes do not occupy that space in the lower front or back half of the structure, but if need be the area could be bumped out.

Figure 15:
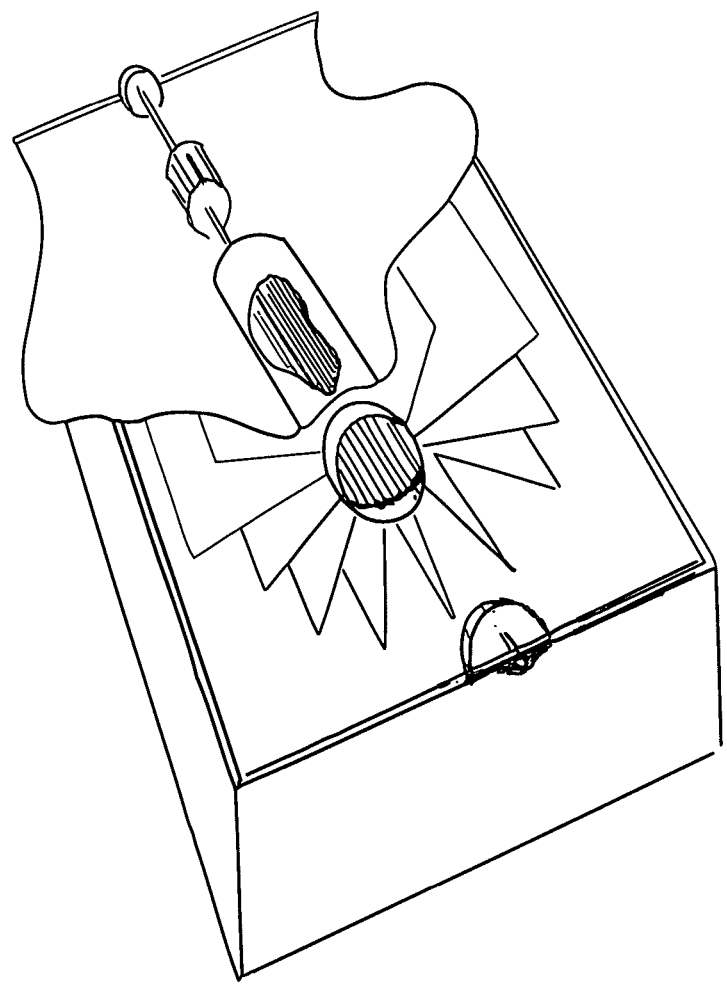
FIG. 15 is a perspective view of a horizontal wind turbine.

Turning to FIG. 15, another embodiment of a wind generator is shown.

Figure 16:
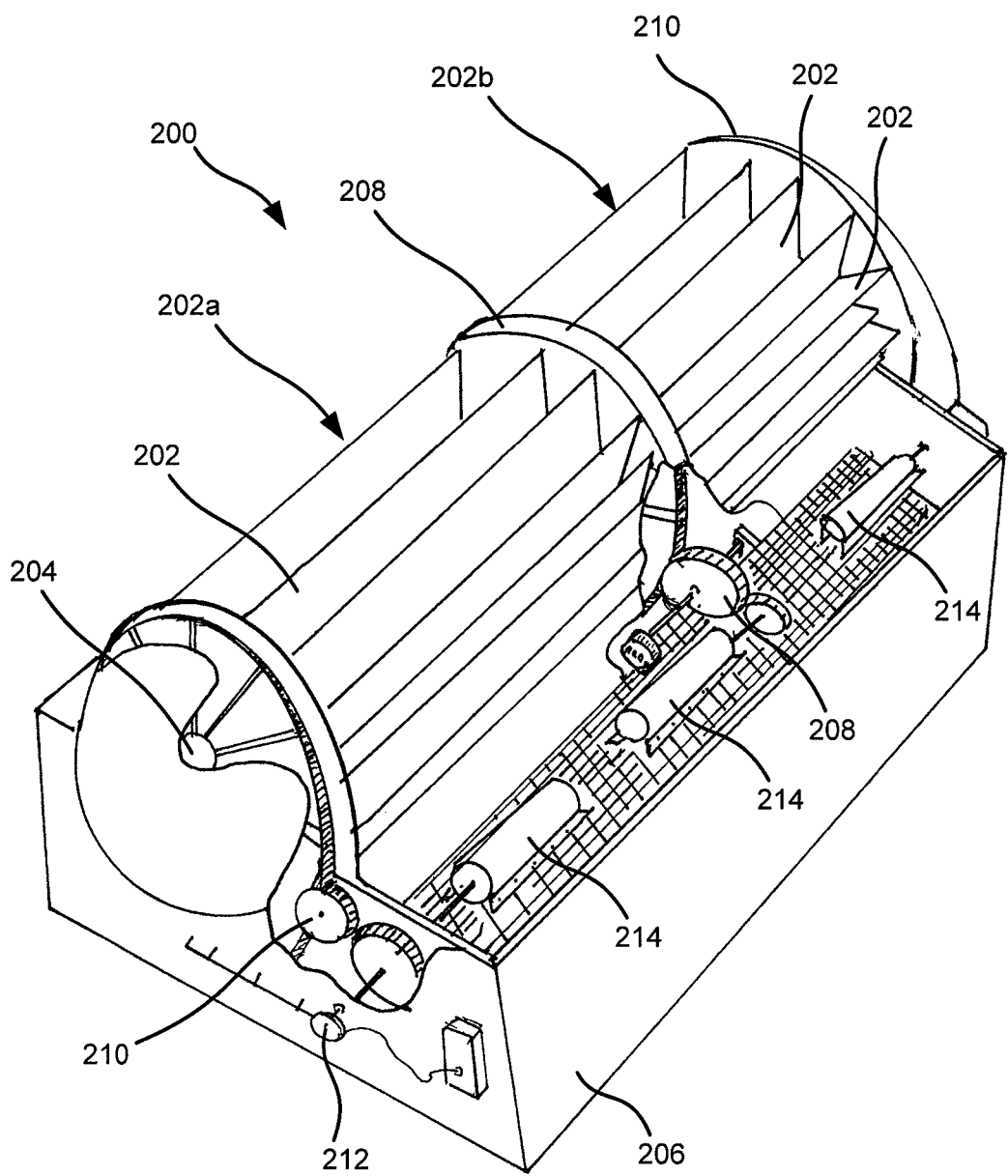
FIG. 16 is a perspective view of a further embodiment of a system for wind energy transfer.

Turning to FIG. 16, a schematic diagram of a system for wind energy transfer is shown. The system 200 includes a set of vanes 202 which are integrate with or attached to a central shaft 204. The set of vanes may be seen as two separate sections 202a and 202b. The set of vanes 202 and central shaft 204 are located within a housing 206 with the central shaft supported at each end by the housing 206. The set of vanes 202, are divided or separated by a central gearbox 208 which is supported by a tubular frame. In operation, the entire set of vanes 202a and 202b rotate about the central shaft 204.

The housing 206 protects the mechanics of the system 200 from damage and may be manufactured from a material such as, but not limited to metal fiberglass or the like. In operation, lubricant may need to be pumped into the system which then flows to an oil pan (not shown) so that it may be recycled. The oil may be used to assist in the movement of the mechanics of the system.

Two other gearboxes, or flywheels with gears, 210 are located at each end of the central shaft 204 to control the centrifugal force being experienced by the system in windy conditions. The gearboxes 208 and 210 operate to control the distribution of the movement in response to the velocity of the wind. For example, the wind may drive the gearboxes 208 and 210 counterclockwise which result in a driveshaft 212 being rotated clockwise. The driveshaft 212 is in mechanical connection with the gearbox 210. The flywheels 210 may also power different modes of transferring energy such as ratio gears, mesh gears, automatic transmissions or manual or automatic clutches. In the preferred embodiment, each gearbox 208 or 210 drives an individual shaft that powers its own generator 214.

In one embodiment, the movement or rotation of the driveshaft may cause an attached generator to pump oil from the oil pan to lubricate the gears.

In the current embodiment, the generators 214 are induction motor or generators that operate simultaneously which may allow the flywheels 210 to be brought up to speed using very little electricity. This is with the assumption that the generators are connected to a power grid for distributing power.

Since it is more likely that the system will experience variable winds, i.e. fluctuating wind speeds, start up of the system may be an important factor. For instance, if the winds are at a low velocity, such as 5 km/hr, the rotation of the flywheels may be manually initiated in order for the system to be able to generate energy with lower velocity wind speeds instead of the system sitting idle or burning energy rather than producing energy.

A booster motor may also be incorporated in order to assist in powering the generators 214 and/or the flywheels if there is no power stored in the grid or no power stored in the system.

An advantage of the system of FIG. 16 is that energy may be generated at different velocity wind speeds, the system may be able to generate power at wind speeds which are lower than the minimum wind speeds required for some current systems.

An advantage of the current disclosure is that it may be able to tap into untapped markets.

Another advantage of the system is that it takes advantage of the high winds on the flat rooftops of high-rise building. Another advantage is the system may be located proximate the place of energy use. Wind farms and solar panel farms sometimes are miles away from the users of electricity because of the best locations for sun or wind is there. Therefore the solution to the problem is to generate electricity within the city limits so that users are able to use nearly every kilowatt produced.

Another advantage is multiple system may be located on close proximity of each other during installation which reduces the amount of wasted space between installments.

The system of the disclosure has a natural flow to the current as it spills over the horizontal vanes.

This inventions flexibility gives it a competitive edge over propeller driven generators. The same description as described above of this invention's workings on high-rise buildings can be utilized anywhere in a wind swept area.

In different situations the hydraulic pump may power a standalone generator or a smaller belt driven generator within its structure.

In the preceding description, for purposes of explanation, numerous details are set forth in order to provide a thorough understanding of the embodiments. However, it will be apparent to one skilled in the art that these specific details are not required. In other instances, well-known electrical structures and circuits are shown in block diagram form in order not to obscure the understanding. For example, specific details are not provided as to whether the embodiments described herein are implemented as a software routine, hardware circuit, firmware, or a combination thereof.

Embodiments of the disclosure can be represented as a computer program product stored in a machine-readable medium (also referred to as a computer-readable medium, a processor-readable medium, or a computer usable medium having a computer-readable program code embodied therein). The machine-readable medium can be any suitable tangible, non-transitory medium, including magnetic, optical, or electrical storage medium including a diskette, compact disk read only memory (CD-ROM), memory device (volatile or non-volatile), or similar storage mechanism. The machine-readable medium can contain various sets of instructions, code sequences, configuration information, or other data, which, when executed, cause a processor to perform steps in a method according to an embodiment of the disclosure. Those of ordinary skill in the art will appreciate that other instructions and operations necessary to implement the described implementations can also be stored on the machine-readable medium. The instructions stored on the machine-readable medium can be executed by a processor or other suitable processing device, and can interface with circuitry to perform the described tasks.

The above-described embodiments are intended to be examples only. Alterations, modifications and variations can be effected to the particular embodiments by those of skill in the art without departing from the scope, which is defined solely by the claims appended hereto.

What is claimed is:
1. A wind energy transfer system comprising:
a central shaft that is substantially horizontal;
a plurality of vanes mounted to the central shaft to gather wind power;
a first assembly of sprockets, gears or pulleys mounted on the central shaft;
an electromagnetic generator;
a second assembly of sprockets, gears, flywheels or pulleys mounted on the electromagnetic generator;
an induction motor for bringing the central shaft's rotation up to a predetermined speed;
a wind spiller for directing wind towards the plurality of vanes;

an energy storage assembly for storing power generated by said wind energy transfer system and providing the stored power to the induction motor; and a hydraulic storage assembly for hydraulically storing power generated by said wind energy transfer system, which comprises a pump and a fluid tank, wherein the pump is connected to the electromagnetic generator;

wherein the first assembly of sprockets, gears, flywheels or pulleys is coupled to the second assembly of sprockets, gears, flywheels or pulleys such that the rotation of the central shaft is in the opposite direction to the rotation of the electromagnetic generator;

wherein the electromagnetic generator is located substantially within the central shaft;

wherein the central shaft is split into at least two independently rotating sections;

wherein each section of the central shaft has an assembly of sprockets, gears, flywheels or pulleys;

wherein the electromagnetic generator also operates as the pump.

2. The system of claim 1 further comprising a support mechanism for mounting said wind energy transfer system to a vehicle.

3. The system of claim 1 wherein said wind energy transfer system is mounted to a vehicle and the electromagnetic generator is connected to a battery in the vehicle such that the electromagnetic generator charges or powers the battery.

* * * * *